United States Patent
Carbajo et al.

(10) Patent No.: US 12,368,938 B2
(45) Date of Patent: Jul. 22, 2025

(54) METHOD FOR COHERENT, UNSUPERVISED, TRANSCRIPT-BASED, EXTRACTIVE SUMMARISATION OF LONG VIDEOS OF SPOKEN CONTENT

(71) Applicant: University College Dublin, National University of Ireland, Dublin (IE)

(72) Inventors: Ricardo Simon Carbajo, Dublin (IE); Sean Mahon, Dublin (IE); Hanene Jemoui, Dublin (IE)

(73) Assignee: University College Dublin, National University of Ireland (IE)

( * ) Notice: Subject to any disclaimer, the term of this patent is extended or adjusted under 35 U.S.C. 154(b) by 49 days.

(21) Appl. No.: 18/539,654

(22) Filed: Dec. 14, 2023

(65) Prior Publication Data
US 2024/0205520 A1 Jun. 20, 2024

(30) Foreign Application Priority Data
Dec. 14, 2022 (GB) .................................. 2218879

(51) Int. Cl.
*H04N 21/8549* (2011.01)
*G06F 40/40* (2020.01)
*G10L 15/26* (2006.01)

(52) U.S. Cl.
CPC ......... *H04N 21/8549* (2013.01); *G06F 40/40* (2020.01); *G10L 15/26* (2013.01)

(58) Field of Classification Search
CPC ............... H04N 21/8549; H04N 21/4394; G06F 40/40; G06F 16/739; G06F 40/289;

(Continued)

(56) References Cited

U.S. PATENT DOCUMENTS 11,004,095 B2* 5/2021 Ekambaram ....... G06Q 30/0253
11,670,085 B2* 6/2023 Verma ................... G06V 20/47
386/241

(Continued)

FOREIGN PATENT DOCUMENTS

CN 113505213 10/2021

OTHER PUBLICATIONS

4th International Conference on Applied Machine Learning (ICAML),"Research on Automatic Generation of Text Summaries in News Key Information Extraction"; 2022; (pp. 151-155).

(Continued)

*Primary Examiner* — Helen Shibru
(74) *Attorney, Agent, or Firm* — K&L Gates LLP

(57) ABSTRACT

Disclosed is a video summarisation method that includes converting an input video file to a video transcript using speech recognition, segmenting the video transcript into a plurality of paragraphs using a transformer based model, performing relevance ranking of the plurality of paragraphs by assigning a paragraph importance score to each paragraph, based on relevance of each paragraph to an overall content of the video transcript, creating a plurality of candidate summaries from the plurality of paragraphs, each candidate summary comprising two or more paragraphs, performing coherence reranking of the plurality of candidate summaries based on a combination of coherence and relevance of each candidate summary, and selecting a summary based on the coherence reranking.

13 Claims, 6 Drawing Sheets

(58) Field of Classification Search
CPC ......... G06F 40/30; G10L 15/26; G06V 20/47; G06N 3/045
USPC ......................................................... 386/241
See application file for complete search history.

(56) References Cited

U.S. PATENT DOCUMENTS

| | | | | |
|---|---|---|---|---|
| 11,880,806 | B2* | 1/2024 | Preuss | G10L 15/18 |
| 11,915,701 | B2* | 2/2024 | Leidner | G06N 3/047 |
| 12,008,038 | B2* | 6/2024 | Chalana | G06F 16/75 |
| 12,050,879 | B2* | 7/2024 | Ranganathan | G06F 40/289 |
| 12,106,056 | B2* | 10/2024 | Lam | G06F 40/35 |
| 12,200,402 | B2* | 1/2025 | Huang | G06F 40/169 |
| 2004/0153309 | A1* | 8/2004 | Lin | G06F 40/40 704/9 |
| 2005/0246410 | A1* | 11/2005 | Chen | G06F 16/345 709/200 |
| 2020/0034433 | A1* | 1/2020 | Cassidy | G06F 21/32 |
| 2021/0043211 | A1 | 2/2021 | Leidner et al. | |
| 2023/0153341 | A1* | 5/2023 | Yoon | G06F 16/35 704/9 |
| 2024/0378397 | A1* | 11/2024 | Liu | G06F 40/174 |
| 2024/0403376 | A1* | 12/2024 | Parikh | G06F 16/9535 |
| 2025/0005265 | A1* | 1/2025 | Medalion | G06F 40/253 |
| 2025/0036861 | A1* | 1/2025 | Goshen | G06F 40/166 |

OTHER PUBLICATIONS

Search Report for United Kingdom Patent Application No. 2218879.1; date of mailing Jun. 15, 2023; (1 page).

* cited by examiner

400

METHOD FOR COHERENT, UNSUPERVISED, TRANSCRIPT-BASED, EXTRACTIVE SUMMARISATION OF LONG VIDEOS OF SPOKEN CONTENT

CROSS REFERENCE TO RELATED APPLICATIONS

This is application claims priority to and the benefit of United Kingdom Patent Application No. 2218879.1 filed on Dec. 14, 2022, the entire disclosure of which is incorporated by reference herein.

FIELD

The present disclosure relates to video summarisation, and more particularly to summarisation of videos based on text extractive summarisation techniques.

BACKGROUND

Extractive summarisation with the goal of producing a summary video requires not only identifying important content but also ensuring the summary is coherent for the viewer. This creates challenges in selecting summary content and previous methods which summarise text or video without audio do not work well in this regard.

An existing publicly available dataset is used to train and evaluate models on summarisation of video transcripts. The intended use is to predict the text of a slide show from the spoken content. Further, a commercially available model uses transformers to convert text input with a length of less than 512 words to a summary of three sentences. Another method provides speech-to-text services which contains functionality to segment speech into 'chapters' by topic and produce a short, abstractive text summary of each chapter.

While there are a number of existing methods to summarise text or video without audio, extractive summarisation of videos with spoken content by using speech recognition on NLP methods has not been explored to the same depth. In general, most existing work either operates on text only, or video only, without an effort to predict or utilise a transcript. In addition to this, much of the current work is based on supervised learning, meaning that it requires labelled data. Existing extractive summarisation systems almost exclusively select individual sentences and generally only use section/paragraph information if it is already present in the input text.

Hence, in view of the above, there is a need for system and method that generate a coherent summary video of an input video file content by using speech recognition on NLP methods, and that overcomes the disadvantages associated with the existing systems.

SUMMARY

According to the invention there is provided, as set out in the appended claims, a video summarisation method that includes converting an input video file to a video transcript using speech recognition; segmenting the video transcript into a plurality of paragraphs using a transformer based model; performing relevance ranking of the plurality of paragraphs by assigning a paragraph importance score to each paragraph, based on relevance of each paragraph to an overall content of the video transcript; creating a plurality of candidate summaries from the plurality of paragraphs, each candidate summary comprising two or more paragraphs; performing coherence reranking of the plurality of candidate summaries based on a combination of coherence and relevance of each candidate summary; and selecting a summary based on the coherence reranking.

In an embodiment of the present invention, the performing the coherence reranking comprises assigning a final score to each candidate summary based on paragraph importance scores of each paragraph of corresponding candidate summary, and an average coherence score of pairs of consecutive paragraphs of corresponding candidate summary.

In an embodiment of the present invention, the video transcript includes a plurality of sentences and timestamps.

In an embodiment of the present invention, the method further comprises generating a summary video or audio by identifying segments of the input video corresponding to paragraphs of the selected summary based on the timestamps, and joining the identified segments.

In an embodiment of the present invention, the method further comprises performing relevance ranking of a plurality of sentences of the selected summary based on relevance of each sentence to overall content of the selected summary, creating a plurality of candidate shortened summaries from the plurality of sentences, each candidate shortened summary comprising two or more sentences, performing coherence reranking of the plurality of candidate shortened summaries based on a combination of coherence and relevance of each candidate shortened summary, selecting a shortened summary based on the coherence reranking, and generating a trailer video based on the shortened summary.

In an embodiment of the present invention, the segmenting the video transcript into the plurality of paragraphs comprising constraining length of each paragraph based on corresponding fixed upper and lower time limits in corresponding input audio.

In an embodiment of the present invention, the performing the relevance ranking comprises embedding the plurality of paragraphs with pretrained transformer model(s), computing embedded similarities among each pair of paragraphs using a similarity matrix, and using a page rank algorithm to rank the plurality of paragraphs in order of their relevance.

In an embodiment of the present invention, the method comprises generating the paragraph importance score for each paragraph using an ensemble of a plurality of transformer models, each trained using different unsupervised objectives, wherein the outputs of the plurality of transformer models are combined to generate the paragraph importance score for each paragraph.

In an embodiment of the present invention, the transformer based model for segmenting the video transcript into the plurality of paragraphs is trained using unsupervised and supervised domain adaptation, transferring the learning to speech transcripts on specific target domains, and wherein one or more adapter layers inserted into general NLP transformer models are trained using data of other domains to generate the transformer based model for segmenting the video transcript.

In an embodiment of the present invention, the coherence reranking further comprises generating a coherence score of each pair of paragraphs using a supervised transformer based model, wherein the transformer based model is a Siamese architecture.

In an embodiment of the present invention, the method further comprises computing contextualised embeddings of each token of an input pair of paragraphs; computing scores and weights of each of the m×n pairs of the tokens of a paragraph embedding of length m and width n; computing a weighted average of the scores and weights of the pair of paragraphs to generate a coherence score.

In an embodiment of the present invention, the coherence score is 1, when the input pair of paragraphs are coherent, and the coherence score is −1, when the input pair of paragraphs are non-coherent.

In an embodiment of the present invention, there is provided a video summarisation system that includes a memory to store one or more instructions; and a processor communicatively coupled to the memory, and configured to execute the one or more instructions to convert an input video file to a video transcript using speech recognition; segment the video transcript into a plurality of paragraphs using a transformer based model; perform relevance ranking of the plurality of paragraphs by assigning a paragraph importance score to each paragraph, based on relevance of each paragraph to an overall content of the video transcript; create a plurality of candidate summaries from the plurality of paragraphs, each candidate summary comprising two or more paragraphs; perform coherence reranking of the plurality of candidate summaries based on a combination of coherence and relevance of each candidate summary; and select a summary based on the coherence reranking.

There is also provided a computer program comprising program instructions for causing a computer program to carry out the above method which may be embodied on a record medium, carrier signal or read-only memory.

Various embodiments of the present invention provide a video summarisation method and system that employs an unsupervised extractive approach to transform a long video consisting of spoken content to a shortened video consisting of the most important segments of the input video arranged in a coherent manner. The video summarisation method employs a computer vision system which extract or utilise a video transcript to produce coherent summaries. In particular, ensuring that the output video is understandable and of a high quality for viewers is a challenging task and there is considerable value in producing an automated system which can do this to a high standard.

The system and method of the present invention employs an adapter based method to segment spoken text into paragraphs, which is an advancement on existing methods. Further, using a finetuned transformer model to directly optimise the coherence of text in a summary is an important component to 1o improve the quality of summaries for the viewer which is not used elsewhere.

Furthermore, the compression of an initial summary into a shorter trailer video provides more flexibility to the end client to use the summarised content for different purposes.

Additionally, the use of shared components to efficiently create multiple summaries of different overall lengths, and extracting paragraphs of differing lengths provides the ability to present a user with multiple different summaries of the same content to fit the needs of multiple possible viewers without the need to, for example, run computationally expensive speech recognition models multiple times. Furthermore, the video summarisation method of the present invention does not require either human feedback or ground truth summaries for comparison.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

Figure 1:
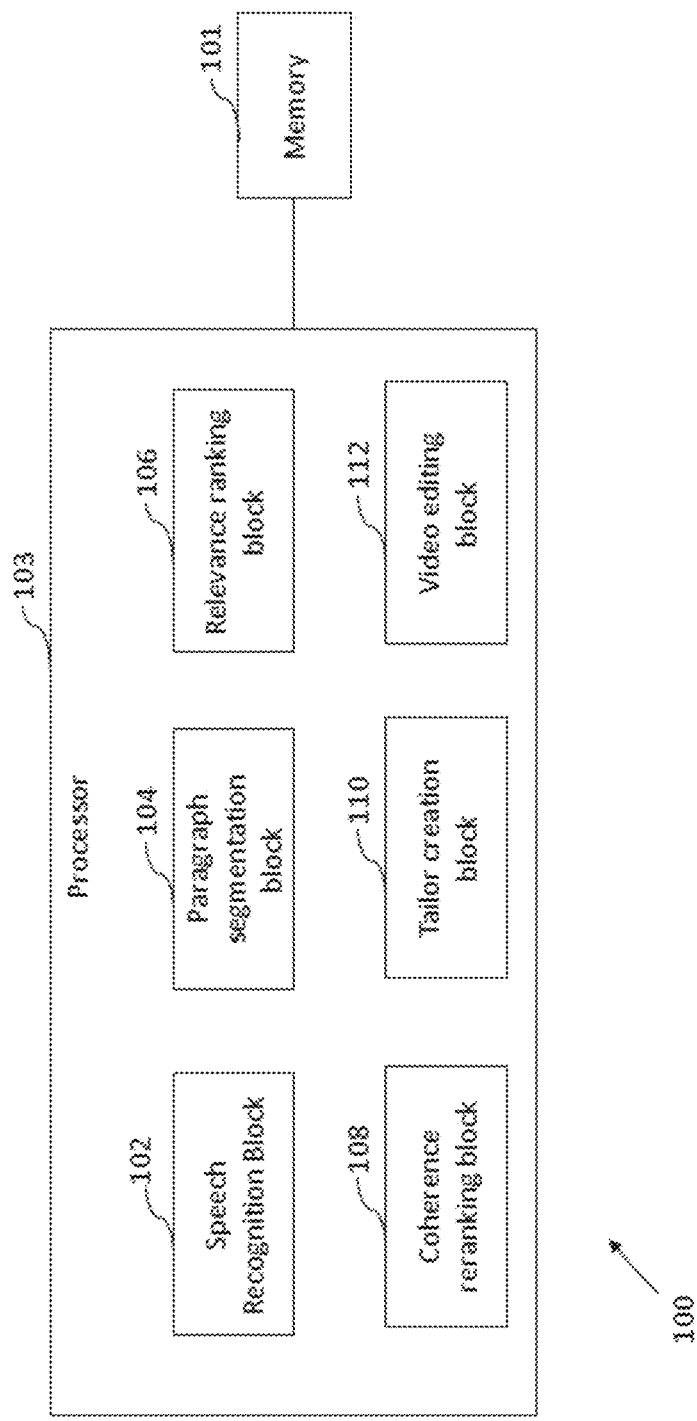
FIG. 1 is a block diagram illustrating a system for summarising videos based on text extractive summarisation techniques, in accordance with an embodiment of the present invention.
Figure 2A:
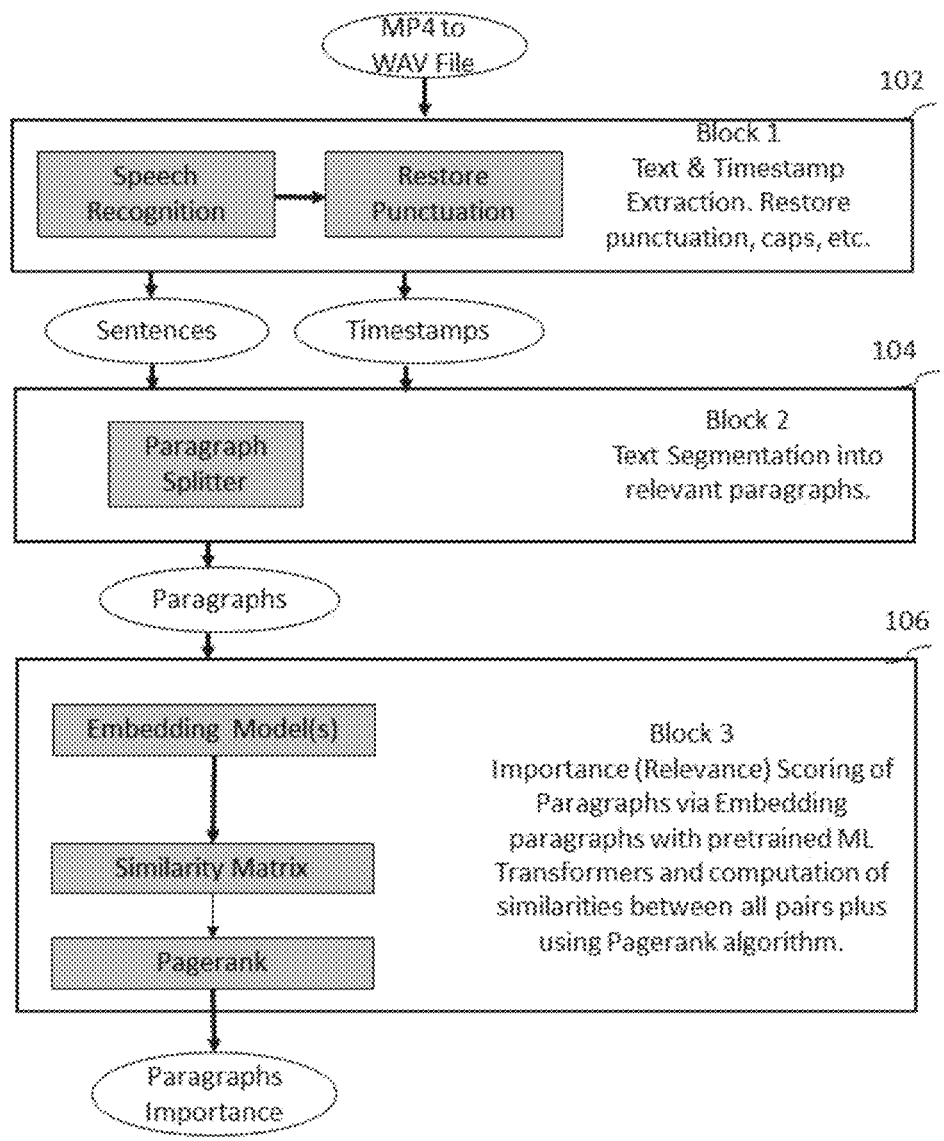
FIGS. 2A and 2B illustrate the summarisation of an input video file using the system of FIG. 1.
Figure 2B:
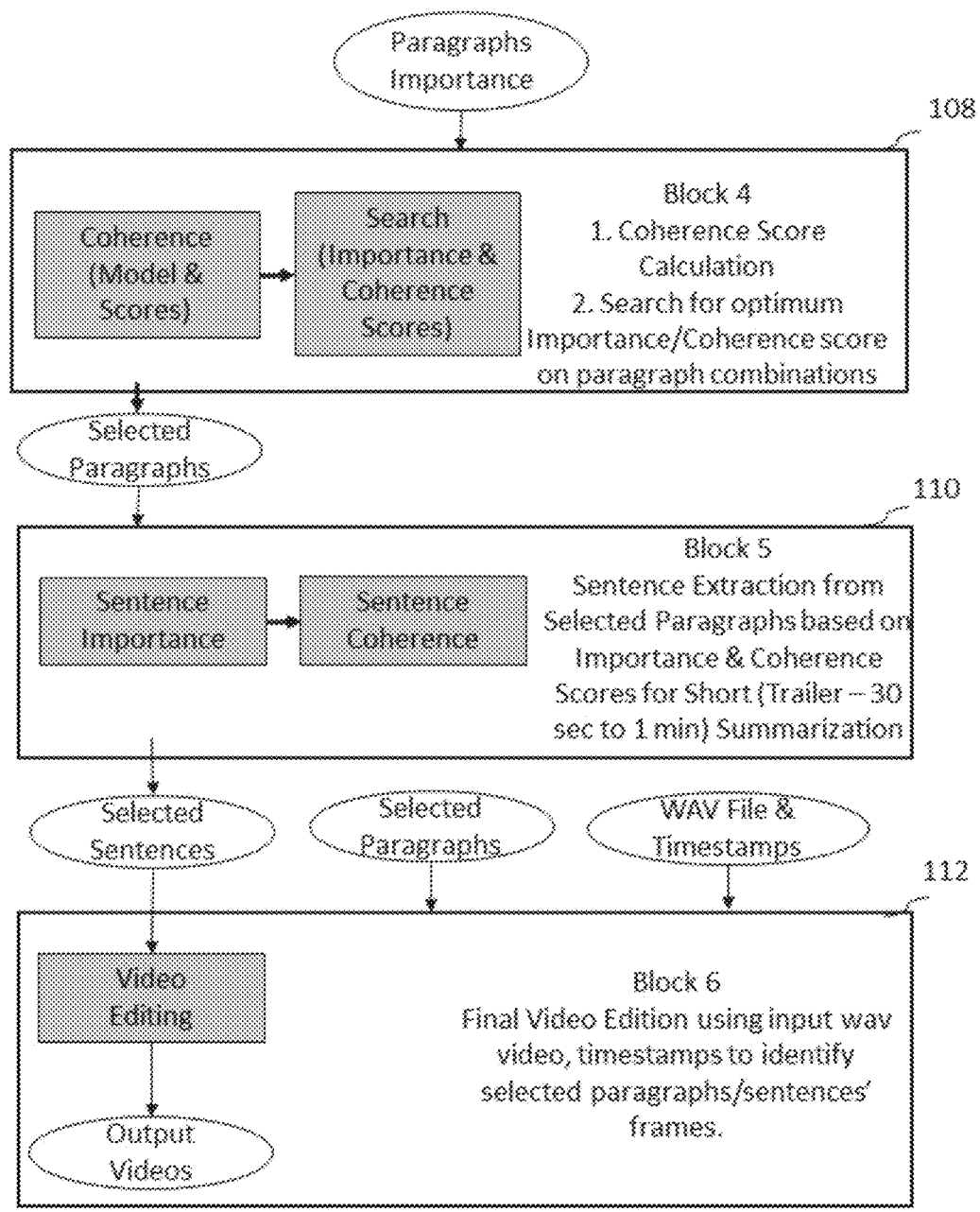

FIG. 1 is a block diagram illustrating a system 100 for summarising videos based on text extractive summarisation techniques, in accordance with an embodiment of the present invention. FIGS. 2A and 2B illustrate the summarisation of an input video file using the system 100.

The system 100 includes a memory 101 to store one or more instructions, and a processor 103 communicatively coupled to the memory 101 to execute the one or more instructions. The processor 103 includes a speech recognition block 102, a paragraph segmentation block 104, a relevance ranking block 106, a coherence reranking block 108, a trailer creation block 110, and a video editing block 112. The speech recognition block 102 includes a transformer based speech recognition system with additional n-gram language model decoding. In an embodiment, the speech recognition block 102 receives shorter segments of an input video file of type WAV, and generates a transcript of the input video file. The speech recognition block 102 may include additional libraries for extracting the timestamps of the words in the generated transcript. The speech recognition block 102 may further restore punctuation, caps, in the video transcript. The resulting video transcript includes sentences and timestamps.

The paragraph segmentation block 104 is a transformer based model used to segment the generated transcript into coherent paragraphs. In an embodiment of the present invention, the paragraph segmentation block 104 automatically segments text into meaningful, coherent paragraphs for processing by the summarisation models. The output of the paragraph segmentation block 104 is a set of paragraphs.

More specifically, while the paragraph segmentation block 104 is largely based on existing methods, using them for summarisation is a novel approach. Also, slight modification may be done to existing methods of paragraph segmentation to make them more suited to working with speech data. At inference time, the model used for paragraph segmentation is used to assign a score to each sentence boundary, indicating the estimated probability that it is also a paragraph boundary. As these paragraph boundaries are scored independently, an additional step may be needed to ensure that the output paragraphs are all of an appropriate length. This may be done by selecting the combination of paragraphs with the maximum probability from the model, following the constraint that the length of each paragraph in corresponding input audio is between a fixed upper and lower limit in seconds. Thus, the proposed approach is hybrid, as it primarily uses text data but includes audio features at test time to be a novel contribution.

The relevance ranking block 106 assigns an importance score to each paragraph in the text, based on its relevance to the overall content of the speech. Ideally those included in the summaries should be those with the highest scores. In an embodiment of the present invention, the relevance ranking is performed by embedding paragraphs with pretrained transformer model(s), computing embedded similarities between all pairs of paragraphs using the similarity matrix, and using a page rank algorithm to rank the paragraphs in order of their relevance. An example of page rank algorithm is TextRank algorithm, which identifies important paragraphs using semantic similarities between paragraphs.

In an embodiment of the present invention, the relevance ranking block 106 generate final paragraph scores using an ensemble of models, finetuned using different unsupervised objectives. According to ensembling method, important segments in a text may be identified by using multiple different transformer models to achieve better results. More specifically, the models may be trained with different unsupervised objectives before using them separately to compute similarities between paragraphs and score paragraphs using the TextRank methods. The average importance scores may be used across multiple models as the final scores for the text.

It is to be noted that the core method of scoring paragraphs for their relevance has been used in multiple other systems, and which include using unsupervised embeddings from a large transformer language model. However, the proposed invention includes a method of combining the results from multiple models, which is a novel feature. The approach of running the TextRank algorithm using different transformer models, trained on different tasks and aggregating results therefore has two advantages. It reduces the impact of rare mistakes from a model which is normally strong. It also means that relevance scores from different models can be compared. When results vary substantially between models, the user can be notified that their input was difficult to summarise and may need manual review. Thus, using disagreement between different models to flag possible errors to a user appears to be original in the context of summarisation.

The coherence reranking block 108 employs a transformer model to identify the best possible summary by creating multiple candidate summaries and scoring each candidate summary based on the importance of individual constituent paragraphs and the coherence of the entire summary. The coherence reranking block 108 employs a transformer based coherence model trained to score the coherence of pairs of consecutive paragraphs. The coherence of a full document can be calculated by taking the average coherence of all consecutive paragraphs contained in it. Note that this includes dummy 'start' and 'end' paragraphs. This may be used alongside the output of the relevance ranking block 106 to identify the summary which maximises a linear combination of relevance and coherence. The searching through candidates and partial candidate summaries may be done using a dynamic programming approach. The input to the coherence reranking block 108 is paragraphs outputted by the paragraph segmentation block 104, and paragraph importance scores outputted by the relevance ranking block 106. The coherence reranking block 108 determines whether a candidate summary is coherent by combining precomputed relevance scores of each paragraph of the candidate summary, and the coherence score of the candidate summary. The output of the coherence reranking block 108 may be a selected summary, or multiple candidate summaries ranked based on a combination of relevance and coherence. The selected summary may include a plurality of selected paragraphs. In an embodiment of the present invention, the selected summary would then be the subset of paragraphs which maximised a linear combination of the relevance scores of each paragraph and the coherence scores of each pair of paragraphs. The approach of reranking summaries to ensure the output is coherent is a distinct and novel feature.

The trailer and hierarchical summary module 110 introduce a new method of creating a summary that is only a few sentences long from an extended text.

The selected sentences may be used to make a shorter "trailer" video. This may be done by passing the output of the coherence reranking block 108 into adapted versions of the relevance ranking block 106 and the coherence reranking block 108. The adapted versions of the relevance ranking and coherence reranking blocks 106 and 108 are configured to select sentences from the selected summary rather than paragraphs from the full document. The adapted versions of the relevance ranking block 106 and the coherence reranking block 108 may be trained using the training data that consists of shuffled sentences within paragraphs rather than paragraphs within documents. The relevance scores may be again computed for sentences using TextRank with transformer embeddings, though in this case, models from supervised semantic similarity may be used. The novelty of the trailer and hierarchical summary module 110 is in summarising the entire input text before further shortening it, as compared to prior systems, which extracts individual sentences, not entire paragraphs and does not have an extractive summary as its final output.

The video editing block 112 use timestamps to identify the segments of the input video which correspond to the selected sentences/paragraphs, and edit them together to produce the summary/trailer videos. The video editing block 112 identifies important temporal sections within the input video file, and organises them into coherent summary, optionally extracting a number of individual sentences from each section. The final selected paragraphs may be then used to create a video consisting of the relevant extracts of the input video. This may be done automatically using existing video editing software. The effects such as crossfades may be added to ensure that the result is of a high quality. The output of the video editing block 112 may be an edited version of the input video.

Given that the video summarisation system primarily uses audio features, the system 100 could be adapted to audio summarisation with limited effort. Further simplification to text only summarisation is also possible. However the focus on coherence would make the system suitable for long texts and summaries, as compared to existing systems.

Figure 3:
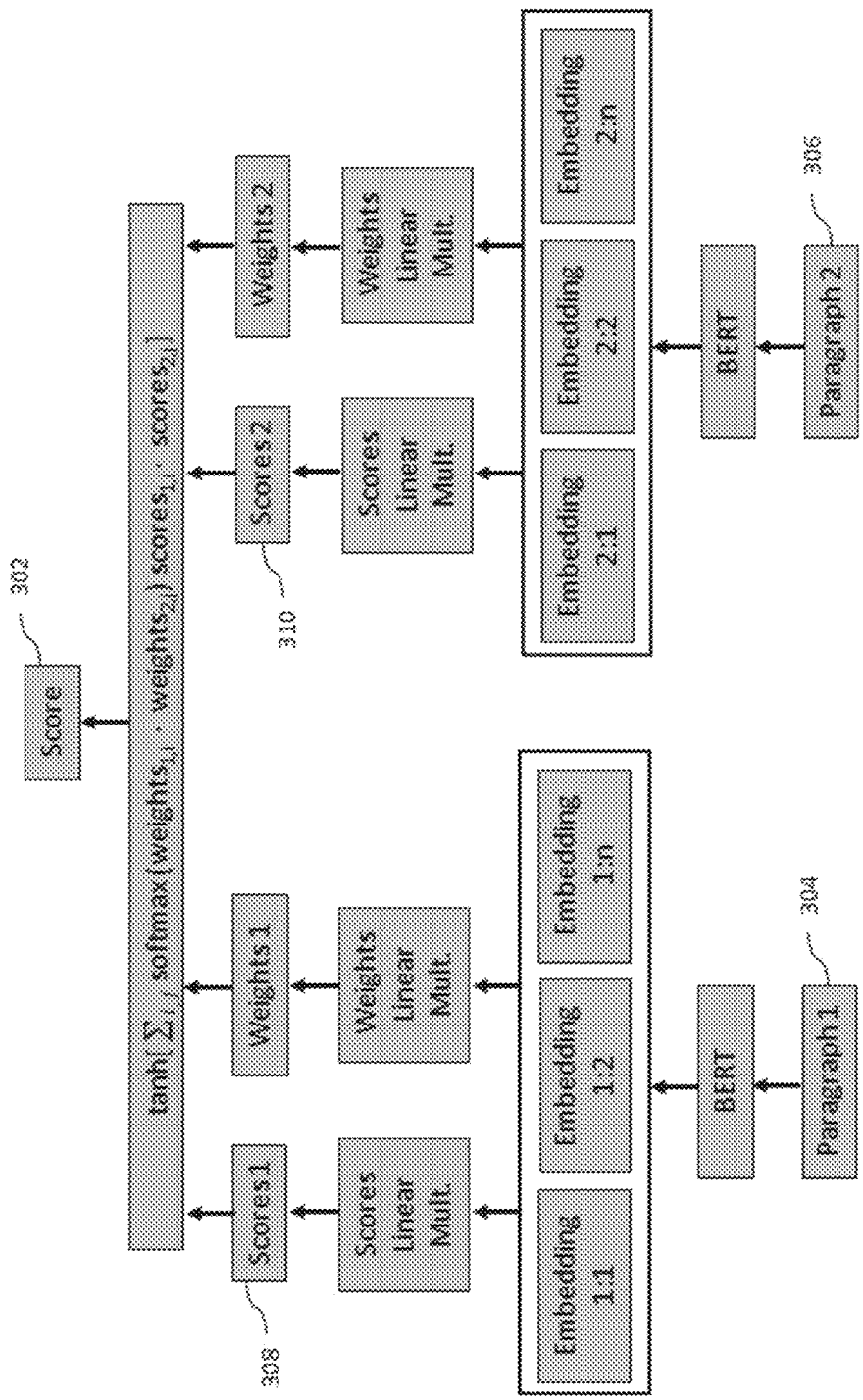
FIG. 3 illustrates a transformer based model employed by the coherence reranking block, for generating a coherence score of a pair of paragraphs, in accordance with an embodiment of the present invention.

FIG. 3 illustrates a transformer based model 300 employed by the coherence reranking block 108, for generating a coherence score 302 of first and second paragraphs 304 and 306, in accordance with an embodiment of the present invention. The transformer based model 300 uses a method for computing coherence scores between two consecutive paragraphs at the token level using a single embedding for the whole text. A token is typically a collection of words, one word or sub-word level.

In an embodiment of the present invention, the transformer based model 300 is a 'siamese' architecture where each paragraph is encoded separately and the resulting embeddings for each paragraph are combined in the final layers of the network. In an example, a finetuned BERT model is being used to perform the initial encoding stage. The finetuned BERT model is adapted from COIBERT model in information retrieval by adding extra attention weights rather than computing max over query tokens, with the goal of prioritizing important tokens/positions in inputs.

An important feature of this approach is that the same initial encoding of a paragraph can be used in to compare with multiple other paragraphs. Using this method, all pairs of paragraphs in a video of n paragraphs could be scored with O(n) calls to BERT. This can be weighted to place more emphasis on the start and end paragraphs of the candidate summary.

The individual scores 308 and 310 are coherence scores related to each of the paragraphs with respect to the other. This is possible as the overall network is a Siamese structure, and it is trained at the same time with both input paragraphs. These scores are intermediate steps to calculate the overall score between paragraphs when the two networks are related in a Siamese structure. These networks are trained with overall score 1 when paragraphs are coherent, and score−1 when are not coherent, and after they are trained, they are used for inferencing.

In an embodiment of the present invention, the transformer based model 300 employs a 'late interaction' style approach. This involves using the pretrained transformer to compute contextualised embeddings of each token in the input paragraphs. For paragraphs embeddings of length m and width n, both a 'score' and a 'weight' value for each of the m×n pairs of the tokens are computed. The intermediate scores 1 and 2 and weights 1 and 2 arise from multiplication of relationships within tokens in the embedding. The tokens arise within the Siamese network within the embeddings. The weights 1 and 2 contains a deeper level of relationships passed into the linear multiplications as it is calculated from the weights of the network. Both scores and weights provide different levels of granularities in the relationships. The weights are then passed to a softmax function, and the results are used to take a weighted average of the scores. The weighted average score 302 provides a measure of whether the pairs of paragraphs are coherent. The late interaction method allows to identify and utilise key words in the input paragraphs to determine if they are coherent rather than depending on a heavily compressed embedding representation.

The embeddings can be modelling relationships at paragraph or sentence level, but here, the late interaction approach models relationship at token level i.e. word or sub-word level.

The late interaction approach has never previously been used for evaluating the coherence of text, and is inspired from ColBERT method for information retrieval. However, the ColBERT model does not use learnable weights for interactions between pairs of tokens. Also, the transformer based model 300 is an unsupervised model for improving the coherence of the output of summarisation models.

In addition, the particular method currently being used, which works by classifying whether pairs of consecutive paragraphs are coherent allows for results to be saved and reused to efficiently compute the coherence of many different partial summaries of the same document. This provides a significant computational benefit over existing systems.

Figure 4:
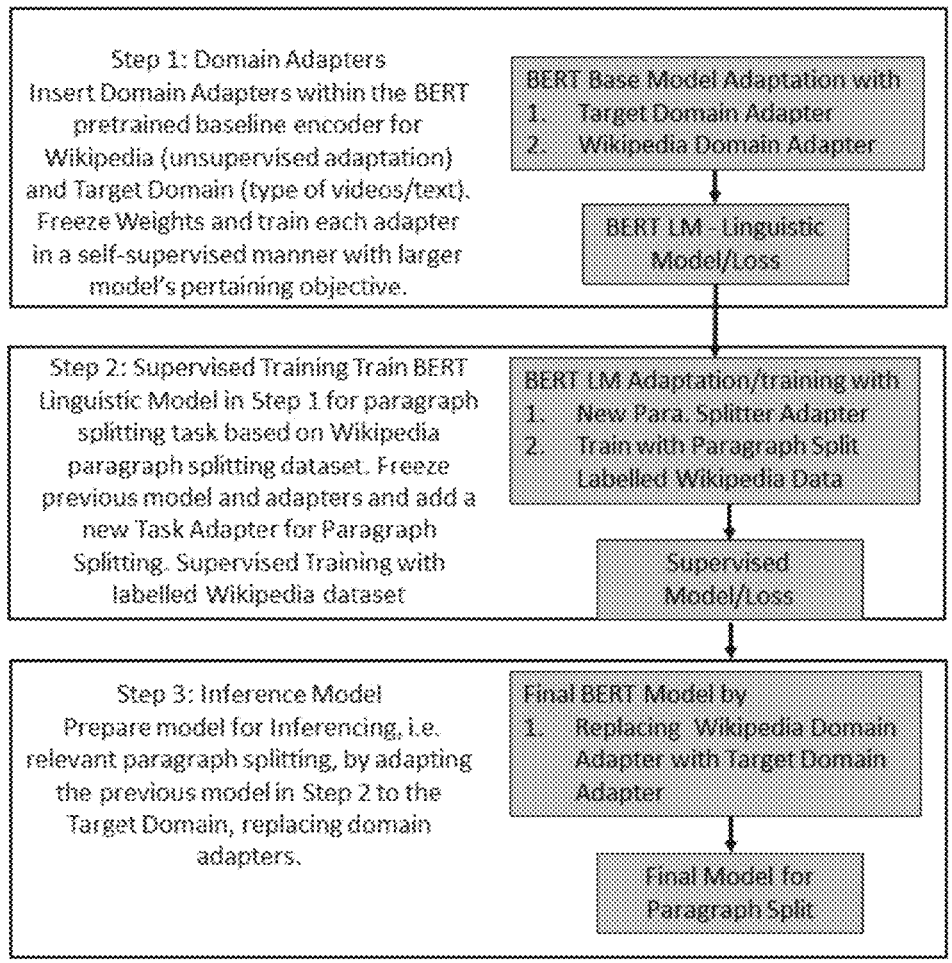
FIG. 4 is a block diagram illustrating a method for paragraph segmentation via domain adaptation, in accordance with an embodiment of the present invention.

FIG. 4 is a block diagram illustrating a method for paragraph segmentation via domain adaptation, in accordance with an embodiment of the present invention.

In the absence of a large, widely available supervised dataset for segmenting speech or dialogue into paragraphs, the transformer based network of the paragraph segmentation block 104 may be trained using supervised learning on other domains and transfer this knowledge to speech transcripts. In particular, this may be done using domain adapters, which are intermediate layers inserted into a pretrained model. Instead of finetuning the entire model, only the adapter layers may be trained on the downstream task. This prevents the model from 'forgetting' what it has learned in pretraining and, by combining adapters, allows for more flexible training regimes.

At step 1, for both Wikipedia and the target domain, adapters are inserted into a pretrained encoder model (i.e. BERT) that may be fine-tuned based on supervised, text only, training data. The weights of the pretrained model may be freezed, and each adapter may be trained in a self-supervised manner with larger model's pertaining objective.

At step 2, the weights of both the wikipedia 'domain' adapter and pretrained model may be freezed, and an extra 'task adapter' may be added. The model may then be trained on the supervised Wiki727k data, to allow the task adapter to be used to segment paragraphs in the speech transcripts.

At step 3, the wikipedia domain adapter may be replaced with the one trained on our n domain adapter, leaving the task adapter in place. This allows to circumvent the lack of training data for the desired domain and still achieve strong results. The approach of splitting domain and task adapters for transferring knowledge across different domains is a novel feature.

Figure 5:
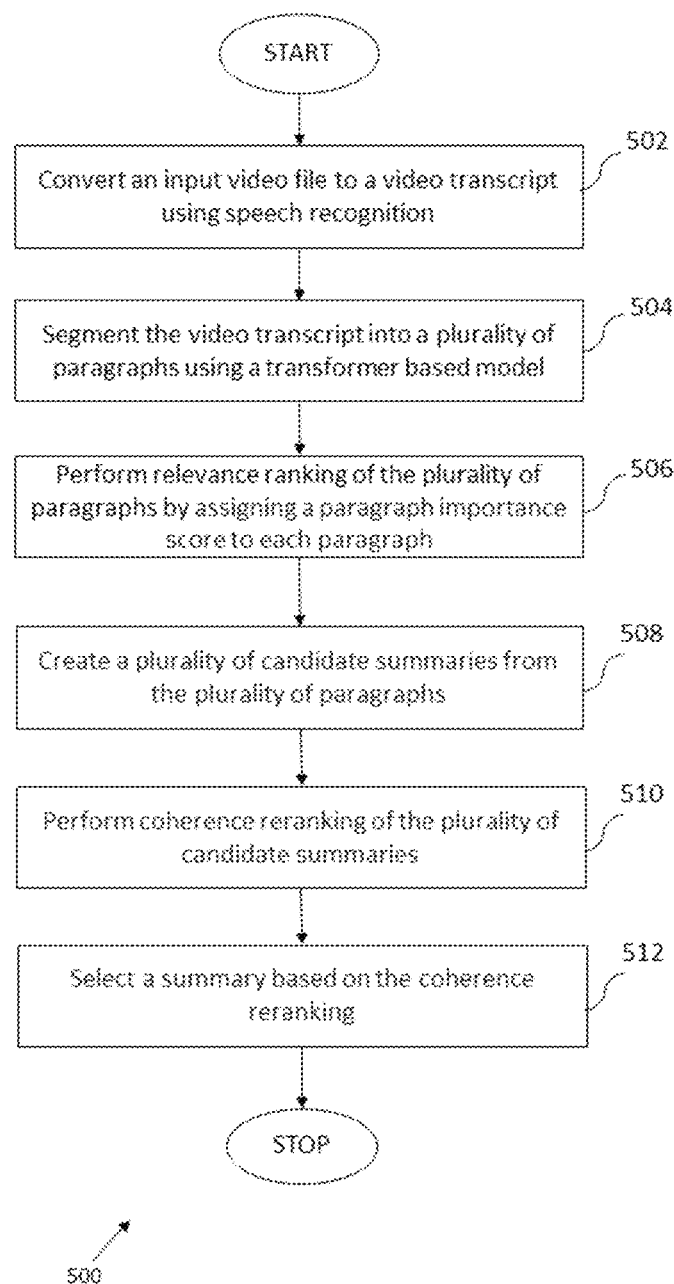
FIG. 5 is a flowchart illustrating a video summarisation method, in accordance with an embodiment of the present invention.

FIG. 5 is a flowchart illustrating a video summarisation method 500, in accordance with an embodiment of the present invention.

At step 502, an input video file is converted to a video transcript using speech recognition.

At step 504, the video transcript is segmented into a plurality of paragraphs using a transformer based model.

At step 506, relevance ranking of the plurality of paragraphs is performed by assigning a paragraph importance score to each paragraph, based on relevance of each paragraph to an overall content of the video transcript.

At step 508, a plurality of candidate summaries is created from the plurality of paragraphs, each candidate summary comprising two or more paragraphs.

At step 510, coherence reranking of the plurality of candidate summaries is performed based on a combination of coherence and relevance of each candidate summary.

At step 512, a summary is selected based on the coherence reranking.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. a memory stick or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable, and they should all be afforded the widest possible interpretation and vice versa.

The invention is not limited to the embodiments hereinbefore described but may be varied in both construction and detail.

The invention claimed is:

1. A video summarisation method comprising:
   converting an input video file to a video transcript using speech recognition;
   segmenting the video transcript into a plurality of paragraphs using a transformer based model;
   performing relevance ranking of the plurality of paragraphs by assigning a paragraph importance score to each paragraph, based on relevance of each paragraph to an overall content of the video transcript;
   creating a plurality of candidate summaries from the plurality of paragraphs, each candidate summary comprising two or more paragraphs;
   performing coherence reranking of the plurality of candidate summaries based on a combination of coherence and relevance of each candidate summary; and
   selecting a summary based on the coherence reranking.

2. The video summarisation method as claimed in claim 1, wherein the performing the coherence reranking comprises assigning a final score to each candidate summary based on paragraph importance scores of each paragraph of corresponding candidate summary, and an average coherence score of pairs of consecutive paragraphs of corresponding candidate summary.

3. The video summarisation method as claimed in claim 1, wherein the video transcript includes a plurality of sentences and timestamps.

4. The video summarisation method as claimed in claim 1, further comprising generating a summary video or audio by identifying segments of the input video corresponding to paragraphs of the selected summary based on the timestamps, and joining the identified segments.

5. The video summarisation method as claimed in claim 1 further comprising the steps of:
   performing relevance ranking of a plurality of sentences of the selected summary based on relevance of each sentence to overall content of the selected summary;
   creating a plurality of candidate shortened summaries from the plurality of sentences, each candidate shortened summary comprising two or more sentences;
   performing coherence reranking of the plurality of candidate shortened summaries based on a combination of coherence and relevance of each candidate shortened summary;
   selecting a shortened summary based on the coherence reranking; and
   generating a trailer video based on the shortened summary.

6. The video summarisation method as claimed in claim 1, wherein the segmenting the video transcript into the plurality of paragraphs comprising constraining length of each paragraph based on corresponding fixed upper and lower time limits in corresponding input audio.

7. The video summarisation method as claimed in claim 1, wherein the performing the relevance ranking comprises embedding the plurality of paragraphs with pretrained transformer model(s), computing embedded similarities among each pair of paragraphs using a similarity matrix, and using a page rank algorithm to rank the plurality of paragraphs in order of their relevance.

8. The video summarisation method as claimed in claim 1, further comprising generating the paragraph importance score for each paragraph using an ensemble of a plurality of transformer models, each trained using different unsupervised objectives, wherein the outputs of the plurality of transformer models are combined to generate the paragraph importance score for each paragraph.

9. The video summarisation method as claimed in claim 1, wherein the transformer based model for segmenting the video transcript into the plurality of paragraphs is trained using unsupervised and supervised domain adaptation, transferring the learning to speech transcripts on specific target domains, and wherein one or more adapter layers inserted into general NLP transformer models are trained using data of other domains to generate the transformer based model for segmenting the video transcript.

10. The video summarisation method as claimed claim 1, wherein the coherence reranking further comprises generating a coherence score of each pair of paragraphs using a supervised transformer based model, wherein the transformer based model is a Siamese architecture.

11. The video summarisation method as claimed in claim 1, further comprising:
    computing contextualised embeddings of each token of an input pair of paragraphs;
    computing scores and weights of each of the m×n pairs of the tokens of a paragraph embedding of length m and width n; and
    computing a weighted average of the scores and weights of the pair of paragraphs to generate a coherence score.

12. The video summarisation method as claimed in claim 1, wherein the coherence score is 1, when the input pair of paragraphs are coherent, and the coherence score is −1, when the input pair of paragraphs are non-coherent.

13. A video summarisation system, comprising:
    a memory to store one or more instructions; and
    a processor communicatively coupled to the memory, and configured to execute the one or more instructions to:
    convert an input video file to a video transcript using speech recognition;
    segment the video transcript into a plurality of paragraphs using a transformer based model;
    perform relevance ranking of the plurality of paragraphs by assigning a paragraph importance score to each paragraph, based on relevance of each paragraph to an overall content of the video transcript;
    create a plurality of candidate summaries from the plurality of paragraphs, each candidate summary comprising two or more paragraphs;
    perform coherence reranking of the plurality of candidate summaries based on a combination of coherence and relevance of each candidate summary; and
    select a summary based on the coherence reranking.

* * * * *